June 2, 1953 P. A. DROUIN 2,640,966

VARIABLE INDUCTANCE COMPARATOR

Filed Aug. 10, 1948

INVENTOR

By Pierre André Drouin

Robert E. Burns

ATTORNEY

Patented June 2, 1953

2,640,966

UNITED STATES PATENT OFFICE 2,640,966

VARIABLE INDUCTANCE COMPARATOR

Pierre André Drouin, Paris, France

Application August 10, 1948, Serial No. 43,457
In France August 14, 1947

3 Claims. (Cl. 336—134)

The present invention relates to a high precision comparator which at the same time is sufficiently resistant and simple for being easily handled by the personnel of mechanical workshops. It is known that besides mechanical jigs and gauges which are subject to many errors, there are high precision measuring devices, some of them being optical and others being electrical or magnetic and which comprise generally electronic tubes, amplifiers, rectifiers and voltage stabilizers. Those devices are delicate and complicated so that their use on machine-tools is excluded. The comparator which is the object of the present invention allows the above drawbacks to be avoided and it is characterized by the fact that it comprises an electromagnetic feeler whose magnetic circuit is constituted by a cylindrical stator inside of which a movable part forming a plunger is displaced axially, and is provided with two windings arranged side by side symmetrically with respect to the transverse plane of symmetry of said plunger and connected to a source of current so as to produce during the displacement of the plunger two voltage variations of opposite directions.

Figure 1:
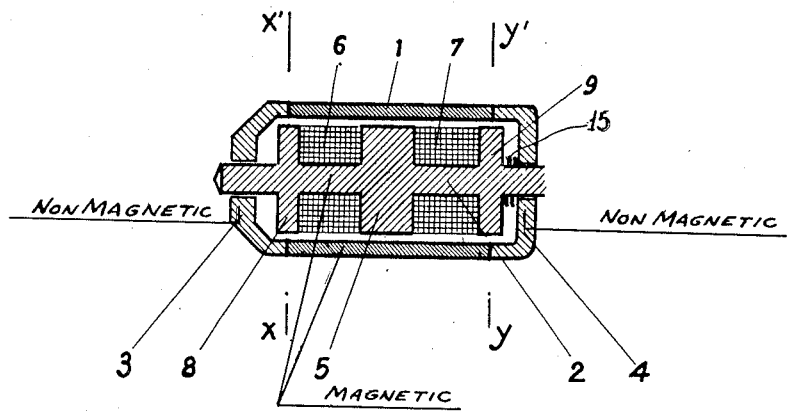

By way of example an embodiment of the comparator according to the invention has been described below and shown on the attached drawing on which:

Fig. 1 shows an axial sectional view of the comparator.

Figures 2, 3:
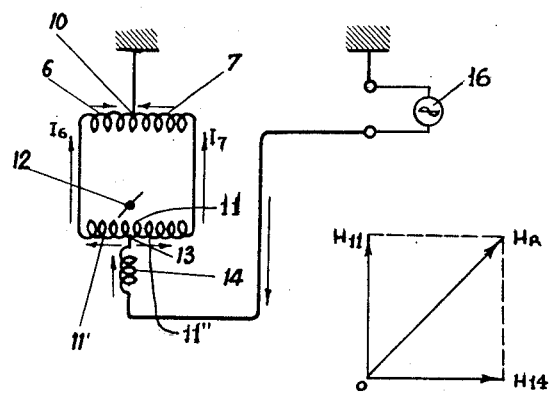

Fig. 2 gives the wiring diagram of the ensemble constituting an electromagnetic comparator and a measuring apparatus.

Fig. 3 illustrates the operation of the measuring apparatus.

The electromagnetic comparator shown on Fig. 1 is constituted by a magnetic circuit comprising a fixed cylindrical part or stator 1, inside of which the movable part of the said circuit is slidably mounted, the said movable part consisting of a cylindrical part 2 carried on bearings 3, 4 in nonmagnetic metal and provided with two wide grooves separated by a central flange 5, the said grooves containing two identical windings 6, 7 connected in series and held by two side flanges 8, 9 which both have the same width which is comparatively small and much smaller than that of the center flange 5. The length of the movable part 2 is such that in the average position of this piece (Fig. 1) the transverse planes of symmetry $xx'$ and $yy'$ of the side flanges 8, 9 coincide with the planes passing through the edges of the cylindrical stator 1. When the common point of the windings 6, 7 is connected to one pole of the source of supply or grounded, the other ends of the said windings being connected to the other pole of the supply, any displacement of part 2 will cause an increase in the reluctance of the magnetic-circuit related to one of the coils 6, 7 and a corresponding decrease in the reluctance of the other half-circuit, and accordingly there will be an unbalance between the reactances of those two coils in one or in the other direction according as the feeler is displaced. Therefore there will be a difference between the voltages across the terminals of those two coils, the said difference being easily measured by means of a calibrated instrument having a dial graduated to directly read the values of the displacements of the feeler. A spring 15 pushes the plunger so as to apply same in the usual manner on the piece to be measured.

As shown on Fig. 2, the mid point 10 of coils 6, 7 of the feeler is connected to ground while the free terminals of the said coils are respectively connected to the terminals of a fixed winding 11 on a measuring apparatus comprising a pivoted magnetic vane 12 whose deflections are giving the required indication, the mid point 13 of winding 11 being connected to one pole of the source of supply 16 the other pole of which is connected to ground or to the mid point 10 of winding 6, 7 of the feeler. This measuring apparatus comprises a compensating fixed winding 14 inserted between the source of supply and the mid point 13 of winding 11 and the axis of which is perpendicular to the axis of winding 11. The soft iron vane 12 is deflected according to the direction of the field $H_R$ (Fig. 3) resulting from the composition of the two fields $H_{11}$ and $H_{14}$ which are perpendicular to one another. If the voltage furnished by the source 16 varies, the fields $H_{11}$ and $H_{14}$ vary in the same proportion, so that the direction of the resultant field $H_R$ remains constant and the indications of the apparatus are not influenced by the voltage variations of the source. When the plunger of the comparator is in its average position, in which the coils 6, 7 of the comparator are symmetrically placed with respect to the stator 1, the reactances of said coils are equal and the currents $I_6$ and $I_7$ flowing in opposite directions through the parts 11' and 11" of winding 11 have the same intensity so that field $H_{11}$ is equal to zero and the vane 12 is deflected according to the direction of field $H_{14}$. When the plunger 2 carrying the coils 6, 7 is displaced from its average position, an unbalance arises between the reactances of said coils, one of the currents $I_6$, $I_7$ increases whereas the other decreases, so that field $H_{11}$ is given with a value corresponding to the displacement of the plunger and vane 12 is deflected according to the direction of the resultant field $H_R$.

The device according to the invention allows the following advantages to be obtained:

(1) When the plunger 2 is displaced with respect to the stator 1, the thickness of the air gap of the magnetic circuit remains constant for it is determined by the thickness of the annular gap comprised between the flanges 8, 9 of the plunger and the stator 1, the variations of the reluctance of the magnetic circuit being obtained due to the variation of the area of said flanges 8, 9 which faces the inner surface of the magnetic part 1 of the stator. The useful stroke of the plunger is that during which a part of the surface of the flange 8 or 9 which is displaced out of the stator 1 remains in front of the latter, for during this part of the stroke the reluctances of both parts of the magnetic circuit vary linearly in terms of the displacement. Nevertheless, as the displacement of the plunger is only limited by the distance between the bearings 3, 4, the overall stroke of the plunger can be much larger than the part of the stroke which is utilisable for measuring purpose and within which the apparatus has a linear response. The purpose of this arrangement is twofold: on one hand it allows any deterioration of the apparatus to be avoided should too large a piece be introduced in the comparator support since the plunger is not stopped and limited in its stroke. The apparatus while highly sensitive can therefore be used in the shops by nonspecialized labor. On the other hand, all parts, the fixed part as well as the plunger, have a cylindrical form and accordingly the components of the magnetic circuit can be turned and ground which permits an economical and accurate machining.

(2) The use of low inductions and of magnetic materials having a high resistivity which reduce eddy currents to a very small value makes it possible to do away completely with laminated pieces thereby permitting the use of solid pieces which can be easily and accurately machined and which do not risk like laminated cores giving subsequent variations owing to an untightening of the sheet bundles.

(3) The magnetic attraction of the plunger which is very strong in devices in which the variation of reluctance is obtained by bringing the armatures near one another becomes negligible in the present case and accordingly the contact pressure on the piece to be measured is due nearly exclusively to the spring which pushes down the plunger, this arrangement ensuring a constant pressure.

(4) Independently of the fact that the overall stroke of the plunger is very long and makes it possible to avoid any risk of injury as mentioned above, the useful stroke within which the response of the apparatus is linear can take high values when the width of polar pieces 8, 9 is increased. This makes it possible to obtain devices having a long measuring stroke when it is desired to have a wide range of measurements for which a high sensitivity is no more required.

(5) Finally the measuring head comprises two windings connected to the indicating instrument by a three conductor cable of small sectional area which does not need to be armored and which does not require any special precaution. As on the other hand the reactances of the components of the circuits are considerably larger than the resistances, outer occasional or permanent resistances have only a negligible influence on the response of the devices. This feature makes it possible to dispense with any subjection with respect to the maintenance of very good contacts in the circuit and also to place the indicating instrument at some distance from the measuring head.

(6) The indicating or reading instrument on the dial of which the indications given by the apparatus are read is not an ammeter or a voltmeter in which the actions due to the currents or voltages to be measured are balanced by a mechanical torque due for instance to the torsion of a spring. In this instrument the resisting torque which balances the effect of the quantity to be measured is an electromagnetic torque due to the voltage of the supply or to the current passing through the apparatus. This instrument is therefore a tangent galvanometer measuring the ratio of two currents or of two voltages. When the voltage of the source of supply varies, the response of the measuring head varies proportionally but the resisting torque of the indicating apparatus varies in the same manner so that the balance position of the movable instrument is not altered.

Accordingly the indications of this instrument are very broadly independent of the frequency and of the voltage of the A. C. supply which makes it possible to supply the whole ensemble from an industrial source of supply even when it is subject to wide variations without requiring any stabilizing device. Hence a great simplification is obtained in the design and use of the apparatus and in the reliability of its indications.

What I claim is:

1. In an electromagnetic precision comparator, a magnetic circuit comprising a hollow cylindrical stator of magnetic material, a magnetic core movable axially inside said stator and forming the feeler of the comparator, said magnetic core consisting of a cylindrical shaft provided with a central flange and with two side flanges, the distance between the transverse planes of symmetry of said side flanges being equal to the length of the stator so as to form between said stator and movable core two air gaps of constant radial thickness and of variable area, two coils arranged between the central flange and the side flanges respectively, whereby two circuits are formed of which the reluctances vary in opposite directions.

2. In an electromagnetic precision comparator, a magnetic circuit comprising a hollow cylindrical stator of magnetic material, a magnetic core movable axially inside said stator and forming the feeler of the comparator, said magnetic core consisting of a cylindrical shaft provided with a central flange and with two side flanges, arranged symmetrically with respect to the central flange, said three flanges having the same diameter but the width of the side flanges being substantially smaller than that of the central flange and the distance between the transverse planes of symmetry of said side flanges being equal to the length of the stator so as to form between said stator and the movable core two air gaps of constant radial thickness and variable area, two coils arranged between the central flange and the side flanges respectively, whereby two circuits are formed of which the reluctances vary in opposite directions.

3. In an electromagnetic precision comparator, a magnetic circuit comprising a hollow cylindrical stator of magnetic material provided at both ends with two bearings of nonmagnetic material arranged coaxially with said cylinder, a magnetic core movable axially inside said stator and forming the feeler of the comparator, said magnetic core consisting of a cylindrical shaft arranged to slide in said bearings and provided with a central flange, and with two side flanges arranged symmetrically with respect to the central flanges, said three flanges having the same diameter but the width of the side flanges being substantially smaller than that of the central flange and the distance between the transverse planes of symmetry of said side flanges being equal to the length of the stator so as to form between said stator and the movable core two air gaps of constant radial thickness and variable area, two coils arranged between the central flange and the side flanges respectively whereby two circuits are formed of which the reluctances vary in opposite directions.

PIERRE ANDRÉ DROUIN.

References Cited in the file of this patent

UNITED STATES PATENTS

| Number | Name | Date |
|---|---|---|
| 1,964,229 | Tanner | June 26, 1934 |
| 2,013,106 | Nagel | Sept. 3, 1935 |
| 2,417,097 | Warsaw | Mar. 11, 1947 |
| 2,428,234 | Mapp | Sept. 30, 1947 |
| 2,437,639 | Floyd | Mar. 9, 1948 |
| 2,508,494 | Cook et al. | May 23, 1950 |